(12) United States Patent
Quan et al.

(10) Patent No.: US 6,889,343 B2
(45) Date of Patent: May 3, 2005

(54) METHOD AND APPARATUS FOR VERIFYING CONSISTENCY BETWEEN A FIRST ADDRESS REPEATER AND A SECOND ADDRESS REPEATER

(75) Inventors: Tai Quan, San Jose, CA (US); Brian L. Smith, Sunnyvale, CA (US); James C. Lewis, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 755 days.

(21) Appl. No.: 09/815,443

(22) Filed: Mar. 19, 2001

(65) Prior Publication Data

US 2002/0133758 A1 Sep. 19, 2002

(51) Int. Cl.[7] .............................................. G06F 11/00
(52) U.S. Cl. .................................... 714/43; 714/55
(58) Field of Search ............................ 714/43, 50, 51, 714/55, 56; 710/58; 711/154, 146

(56) References Cited

U.S. PATENT DOCUMENTS

| | | | |
|---|---|---|---|
| 4,486,829 A | * 12/1984 | Mori et al. ................... 714/34 |
| 5,265,123 A | 11/1993 | Vijeh et al. ..................... 375/3 |
| 5,519,838 A | 5/1996 | Ziegler et al. ............... 395/299 |
| 5,546,587 A | 8/1996 | Silver .......................... 395/730 |
| 5,588,125 A | 12/1996 | Bennett ....................... 395/306 |
| 5,636,367 A | * 6/1997 | Stones et al. ................ 711/167 |
| 5,740,174 A | 4/1998 | Somer ......................... 370/402 |
| 5,754,877 A | 5/1998 | Hagersten et al. ...... 395/800.29 |
| 5,796,605 A | 8/1998 | Hagersten ................... 364/134 |
| 5,805,839 A | 9/1998 | Singhal ........................ 395/292 |
| 5,852,716 A | 12/1998 | Hagersten .............. 395/200.31 |
| 5,875,179 A | 2/1999 | Tikalsky ...................... 370/315 |
| 5,923,847 A | 7/1999 | Hagersten et al. .......... 709/215 |
| 5,933,610 A | 8/1999 | Chambers et al. .......... 395/293 |
| 5,954,809 A | 9/1999 | Riley et al. .................. 710/119 |
| 5,960,034 A | 9/1999 | Lo ............................... 375/211 |
| 5,966,729 A | 10/1999 | Phelps ......................... 711/146 |
| 6,041,061 A | 3/2000 | Su .............................. 370/461 |
| 6,055,598 A | * 4/2000 | Lange ......................... 710/310 |
| 6,078,337 A | 6/2000 | Fukui et al. ................. 345/521 |
| 6,108,736 A | 8/2000 | Bell ............................ 710/107 |
| 6,167,403 A | 12/2000 | Whitmire et al. ............. 707/10 |
| 6,243,411 B1 | 6/2001 | Chiou ......................... 375/211 |
| 6,247,100 B1 | 6/2001 | Drehmel et al. ............ 711/141 |
| 6,260,096 B1 | * 7/2001 | Eskandari et al. .......... 710/310 |

(Continued)

FOREIGN PATENT DOCUMENTS

EP          0817094 A1      1/1998       ........... G06F/15/16

OTHER PUBLICATIONS

U.S. Appl. No. 09/815,442, Quan et al., Method and Apparatus for Efficiently Broadcasting Transactions between a First Address Repeater and a Second Address Repeater, Mar. 19, 2001.

U.S. Appl. No. 09/815,432, Quan et al., Method and Apparatus for Efficiently Broadcasting Transactions between an Address Repeater and a Client, Mar. 19, 2001.

Primary Examiner—Bryce P. Bonzo
(74) Attorney, Agent, or Firm—Park, Vaughan & Fleming LLP (57) ABSTRACT

In a computer system having a first repeater and a second repeater, the first repeater coupled to the second repeater by a bus, the first repeater operable to transmit a transaction and a control signal to the second repeater, a method, performed by the second repeater, of generating an error comprising: predicting, in a first cycle, that a transaction should be transmitted from the first repeater to the second repeater; determining if a control signal was received within a predetermined number of cycles of the first cycle; and if the control signal is not received within the predetermined number of cycles of the first cycle, then generating an error.

18 Claims, 8 Drawing Sheets

U.S. PATENT DOCUMENTS

| | | |
|---|---|---|
| 6,282,588 B1 | 8/2001 | Yamamoto ..................... 710/27 |
| 6,295,281 B1 | 9/2001 | Itkowsky et al. ............ 370/293 |
| 6,411,628 B1 | 6/2002 | Hauck et al. ................ 370/447 |
| 6,446,215 B1 | 9/2002 | Meyer et al. ................ 713/310 |
| 6,523,076 B1 | 2/2003 | Kruse ......................... 710/119 |
| 6,542,940 B1 * | 4/2003 | Morrison et al. .............. 710/22 |
| 6,557,069 B1 | 4/2003 | Drehmel et al. ............. 710/307 |
| 6,567,885 B1 | 5/2003 | Marmash .................... 710/316 |
| 6,578,071 B2 | 6/2003 | Hagersten et al. ........... 709/215 |
| 6,598,099 B2 * | 7/2003 | Takeda ......................... 710/61 |
| 2002/0133652 A1 * | 9/2002 | Quan et al. .................. 710/107 |
| 2002/0133656 A1 * | 9/2002 | Quan et al. .................. 710/240 |
| 2002/0133657 A1 * | 9/2002 | Quan et al. .................. 710/243 |
| 2002/0133658 A1 * | 9/2002 | Quan et al. .................. 710/243 |
| 2004/0024987 A1 | 2/2004 | Lentz et al. ................... 712/29 |

* cited by examiner

METHOD AND APPARATUS FOR VERIFYING CONSISTENCY BETWEEN A FIRST ADDRESS REPEATER AND A SECOND ADDRESS REPEATER

This patent application discloses subject matter that is related to the subject matter disclosed in U.S. patent application Ser. Nos. 09/815,442 entitled "Method and Apparatus for Efficiently Broadcasting Transactions between a First Address Repeater and a Second Address Repeater," and 09/815,432 entitled "Method and Apparatus for Efficiently Broadcasting Transactions between an Address Repeater and a Client," filed on even date herein. Each of the above Patent Applications is hereby incorporated by reference.

1. FIELD OF THE INVENTION

The present invention relates to the field of multiprocessor computer systems and, more particularly, to the architectural connection of multiple microprocessors within a multiprocessor computer system.

2. BACKGROUND

Multiprocessing computer systems include two or more microprocessors that may be employed to perform computing tasks. A particular computing task may be performed on one microprocessor while other microprocessors perform unrelated computing tasks. Alternatively, components of a particular computing task may be distributed among multiple microprocessors to decrease the time required to perform the computing task as a whole.

A popular architecture in commercial multiprocessing computer systems is the symmetric multiprocessor (SMP) architecture. Typically, an SMP computer system comprises multiple microprocessors connected through a cache hierarchy to a shared bus. Additionally connected to the bus is a memory, which is shared among the microprocessors in the system. Access to any particular memory location within the memory occurs in a similar amount of time as access to any other particular memory location. Since each location in the memory may be accessed in a uniform manner, this structure is often referred to as a uniform memory architecture (UMA).

Processors are often configured with internal caches, and one or more caches are typically included in the cache hierarchy between the microprocessors and the shared bus in an SMP computer system. Multiple copies of data residing at a particular main memory address may be stored in these caches. In order to maintain the shared memory model, in which a particular address stores exactly one data value at any given time, shared bus computer systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches that are storing copies of the previous data. Alternatively, the copies of the previous data may be invalidated in the caches such that a subsequent access to the particular memory address causes the updated copy to be transferred from main memory. For shared bus systems, a snoop bus protocol is typically employed. Each coherent transaction performed upon the shared bus is examined (or "snooped") against data in the caches. If a copy of the affected data is found, the state of the cache line containing the data may be updated in response to the coherent transaction.

Unfortunately, shared bus architectures suffer from several drawbacks which limit their usefulness in multiprocessing computer systems. As additional microprocessors are attached to the bus, the bandwidth required to supply the microprocessors with data and instructions may exceed the peak bandwidth of the bus. Thus, some microprocessors may be forced to wait for available bus bandwidth and the performance of the computer system will suffer when the bandwidth requirements of the microprocessors exceed available bus bandwidth.

Additionally, adding more microprocessors to a shared bus increases the capacitive loading on the bus and may even cause the physical length of the bus to be increased. The increased capacitive loading and extended bus length increases the delay in propagating a signal across the bus. Due to the increased propagation delay, transactions may take longer to perform. Therefore, the peak bandwidth of the bus may decrease as more microprocessors are added.

A common way to address the problems incurred as more microprocessors and devices are added to a shared bus system, is to have a hierarchy of buses. In a hierarchical shared bus system, the microprocessors and other bus devices are divided among several low-level buses. These low-level buses are connected by high-level buses. Transactions are originated on a low-level bus, transmitted to the high-level bus, and then driven back down to all the low level-buses by repeaters. Thus, all the bus devices see the transaction at the same time and transactions remain ordered. The hierarchical shared bus logically appears as one large shared bus to all the devices. Additionally, the hierarchical structure overcomes the electrical constraints of a single large shared bus.

Co-Pending U.S. patent application Ser. No. 09/815,442 entitled "Method and Apparatus for Efficiently Broadcasting Transactions between a First Address Repeater and a Second Address Repeater" discloses a novel architecture that includes a high-level bus, a plurality of low-level buses, and a novel distributed arbiter. As the efficiency of a computer system that includes the above architecture is dependent upon the proper operation of the distributed arbiter, a need exists for methods of verifying the consistency of the distributed arbiter.

3. SUMMARY OF INVENTION

One embodiment is a method performed in a computer system having a first repeater and a second repeater. The first repeater is coupled to the second repeater by a bus and the first repeater is operable to transmit a transaction and a control signal to the second repeater. The second repeater performs the method. In a first cycle, the second repeater predicts that a transaction should be transmitted from the first repeater to the second repeater. The second repeater then determines if a control signal was received within a predetermined number of cycles of the first cycle. Third, if the control signal is not received within the predetermined number of cycles of the first cycle, then the second repeater generates an error.

Another embodiment is a method performed in a computer system having a first repeater, a second repeater, and a third repeater. The first repeater is coupled to the second repeater and the third repeater. The first repeater is operable to transmit a transaction to the second repeater and is operable to transmit a control signal to the third repeater. The third repeater performs the method. In a first cycle, the third repeater predicts that a transaction, which originated from the third repeater, should be transmitted from the first repeater to the second repeater. Next, the third repeater determines if a control signal was received within a predetermined number of cycles of the first cycle. If the control signal is not received within the predetermined number of cycles of the cycle in which the prediction was made, then the third repeater generates an error.

Still another embodiment is a method performed in a computer system having a first repeater, a second repeater, and a third repeater. The first repeater is coupled to the second repeater and the third repeater. The first repeater is operable to transmit a transaction to the second repeater and is operable to transmit a control signal to the second repeater. The second repeater performs the method. The second repeater predicts, in a first cycle, that a transaction that originated from the third repeater should be transmitted from the first repeater to the second repeater. The second repeater then determines if a control signal was received within a predetermined number of cycles of the first cycle. If the control signal is not received within the predetermined number of cycles of the first cycle, then the second repeater generates an error.

5. DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
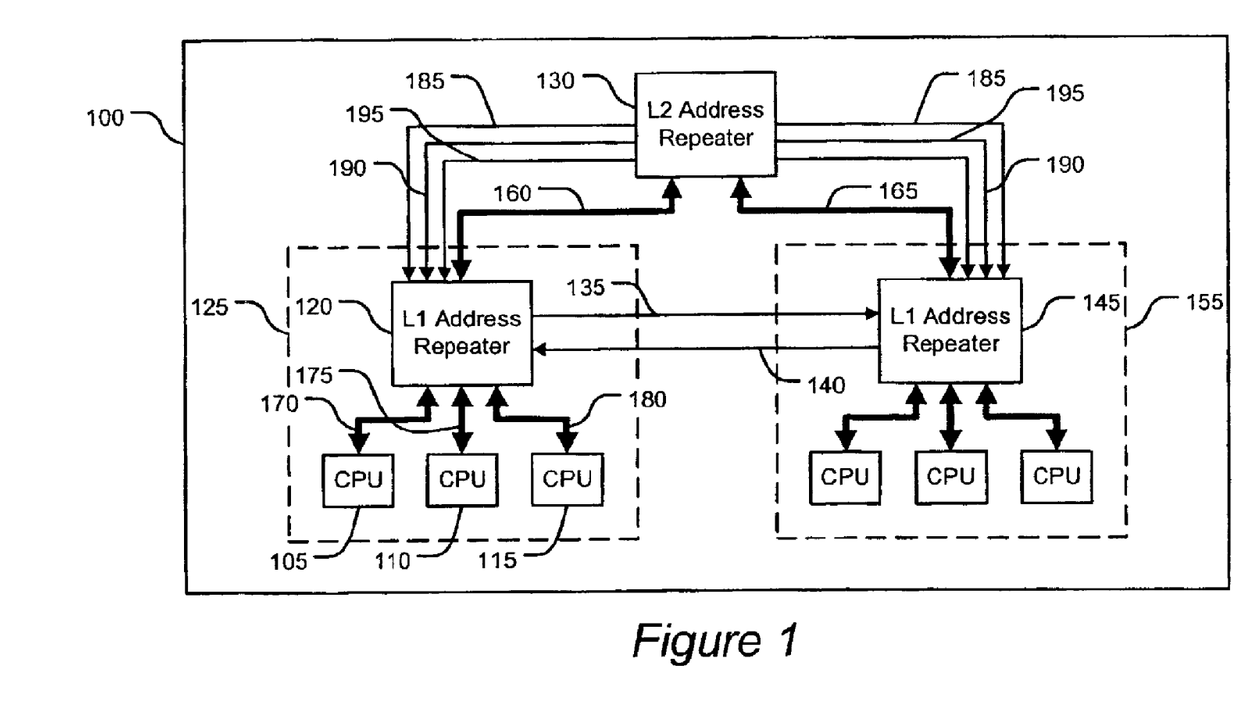
FIG. 1 presents a block diagram of a multiprocessing computer system.

A block diagram of a multiprocessing computer system 100 is presented in FIG. 1. The multiprocessing computer system includes two L1 address repeater nodes 125, and 155, and single L2 address repeater 130. The first L1 address repeater node 125 is coupled to the L2 address repeater via a first L1-L2 bus 160. Similarly, the second L1 address repeater node 155 is coupled to the L2 address repeater via a second L1-L2 bus 165. The second L1 address repeater node 155 may contain the same number of CPUs as in the first L1 address repeater node 125. Alternatively, the number of CPUs in the second L1 address repeater node 155 may be smaller or larger than the number of CPUs in the first L1 address repeater node 125. The computer system 100 may also include other components such as L1 address repeater input-output (I/O) nodes and input-output devices, but these components are not shown so as not to obscure the invention.

5.1 L1 Address Repeater Node

The L1 address repeater node 125 may include a plurality of microprocessors (CPUs) 105, 110, 115. In one embodiment, the CPUs may be an UltraSPARC-III microprocessor. However, in other embodiments, the CPUs may be a digital signal processor (DSP) or a microprocessor such as those produced by Intel, Motorola, Texas Instruments, Transmeta, or International Business Machines. These CPUs may also include memory, such as DRAM memory or RAMBUS memory, and high-speed cache memory (not shown). CPUs 105, 110, and 115 are coupled to an L1 address repeater via CPU buses 170, 175, and 180. The CPU buses 170, 175, and 180 may be any bus that is capable of passing bus transactions. In one embodiment, the CPU bus may provide for a 60-bit wide data path and may also include additional signal lines for control signals as are known in the art.

The CPUs 105, 110, and 115 communicate with the L1 address repeater 120 by broadcasting and receiving bus transactions. Bus transactions may be broadcasted as bit-encoded packets. These packets may also include an address, a command, and/or a source ID. Other information, such as addressing modes or mask information, may also be encoded in each transaction.

5.2 L1 Address Repeater

Figure 2:
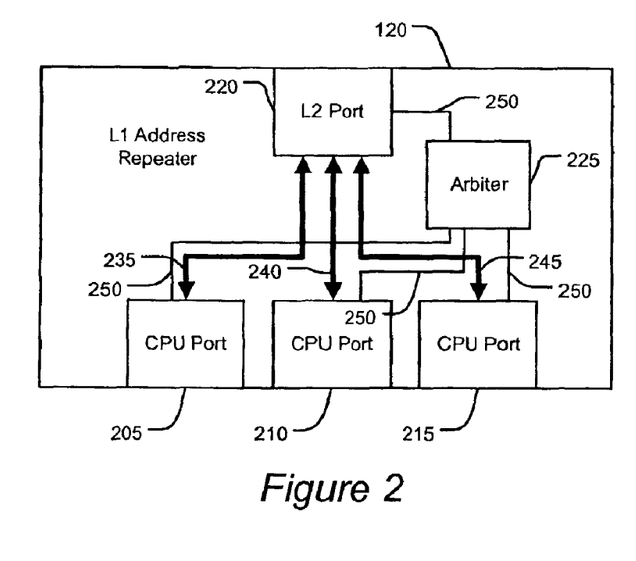
FIG. 2 presents a block diagram of an L1 address repeater.
Figure 4A:
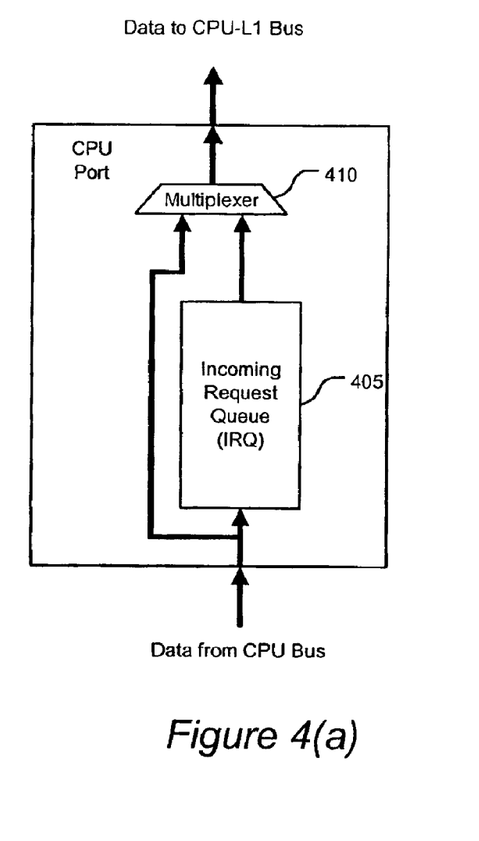
FIG. 4(a) presents a block diagram of a CPU port.
Figure 4B:
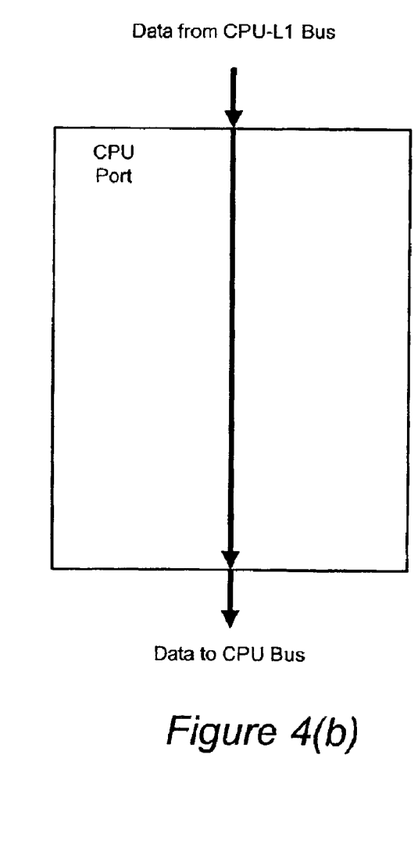
FIG. 4(b) presents another block diagram of a CPU port.
Figure 5:
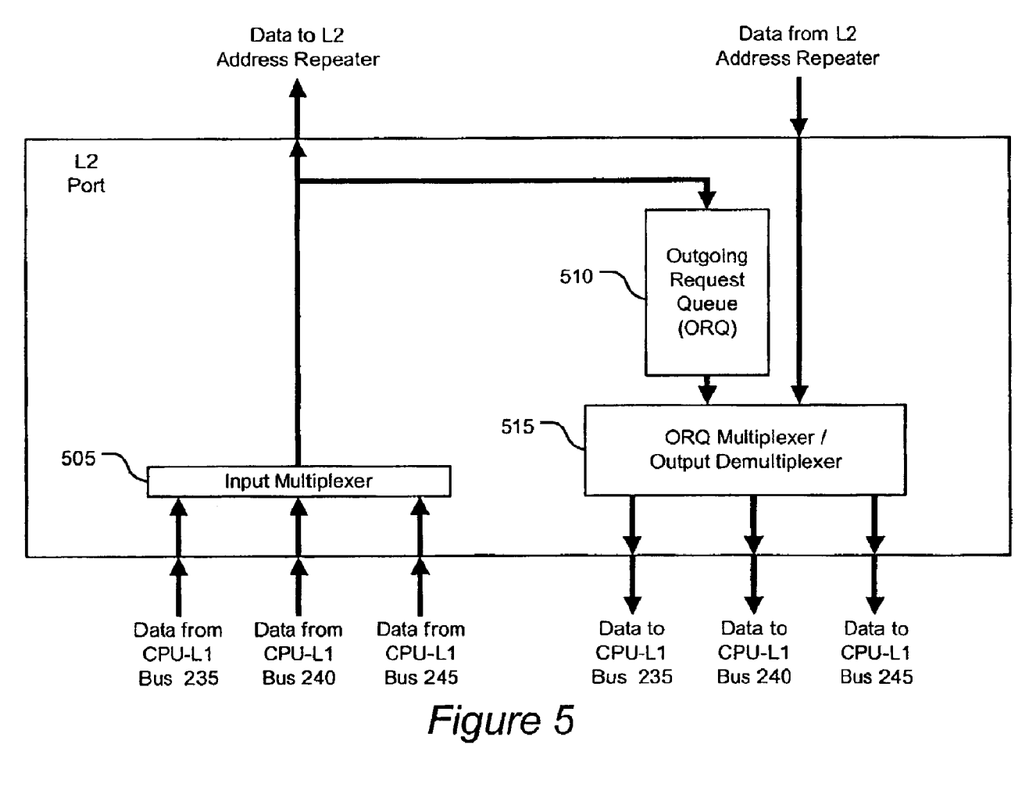
FIG. 5 presents a block diagram of an L2 port.

A block diagram of the L1 address repeater 120 is presented in FIG. 2. L1 address repeater 120 includes a plurality of CPU ports 205, 210, and 215. These ports interface with CPUs via the CPU buses 170, 175, and 180. Embodiments of the ports of the L1 address repeater 120, which are shown in FIG. 4(a), FIG. 4(b), and FIG. 5, are further described in U.S. patent application Ser. No. 09/815,432 entitled "Method and Apparatus for Efficiently Broadcasting Transactions between an Address Repeater and a Client."

5.2.1 L1 Address Repeater Arbiters

Figure 3:
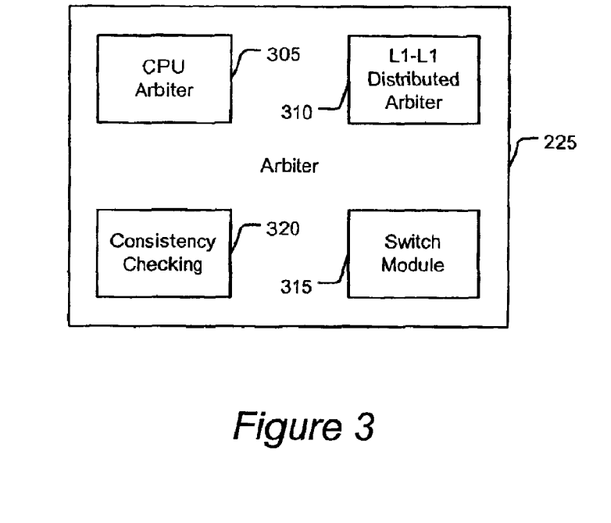
FIG. 3 presents a block diagram of an arbiter.

As shown in FIG. 2, the L1 address repeater also includes an arbiter 225. As shown in FIG. 3, the arbiter 225 may include a CPU arbiter 305, an L1-L1 distributed arbiter 310, a switch module 315, and a consistency-checking module 320.

5.2.1.1 CPU Arbiter

The CPU arbiter 305, which is shown in FIG. 3, is described in U.S. patent application Ser. No. 09/815,432 entitled "Method and Apparatus for Efficiently Broadcasting Transactions between an Address Repeater and a Client."

5.2.1.2 L1-L1 Distributed Arbiter

While many methods of arbitration between L1 address repeaters may be utilized, in one embodiment of the invention, a distributed arbitration scheme may be implemented. In this embodiment, there will be no need for explicit arbitration because each L1 address repeater can accurately predict when the L2 address repeater will access the L1-L2 buses.

In order for an L1 address repeater to accurately predict when the L2 address repeater will access the L1-L2 buses, the L1 address repeater should be made aware of every transaction sent to the L2 address repeater. In some embodiments of the invention, the L1 address repeater should also be made aware of the L1 address repeater that originated each transaction sent to the L2 address repeater.

One method of making an L1 address repeater aware of such transactions is for each L1 address repeater to communicate directly with other L1 address repeaters. For example, each L1 address repeater could assert a TRAN-OUT signal 135 and 140 every time that the L1 address repeater drives a transaction to an L2 address repeater. Each TRAN-OUT signal 135 and 140 could be coupled to a TRAN-IN port (not shown) in each of the other L1 address repeaters in the computer system. Alternatively, other methods of communicating between L1 address repeaters could be used.

In the embodiment described above, each L1 address repeater would typically have a TRAN-IN port for each of the other L1 address repeaters in the computer system. In this embodiment, each TRAN-IN port would be associated with a transaction counter. The counter would be incremented each time another L1 address repeater sends a transaction to the L2 address repeater. The counter would be decremented each time the L1 address repeater receives a transaction from the L2 address repeater that originated from the other L1 address repeater. The value in a particular counter would represent the number of transactions in one of the incoming request queues (IRQs) in the L2 address repeater. The structure of the L2 address repeater ports is described in Section 5.3.1.

5.2.1.3 Switch Module

Referring again to FIG. 3, the L1 address repeater arbiter includes a switch module 315. The switch module 315 is described in U.S. patent application Ser. No. 09/815,432 entitled "Method and Apparatus for Efficiently Broadcasting Transactions between an Address Repeater and a Client."

5.2.1.4 Consistency Checking Module

The L1 arbiter also includes a consistency-checking module 320. The consistency-checking module verifies that predictions made by the L1-L1 distributed arbiter 310 match control signals that are received from the L2 address repeater 130. By making such verifications, the consistency-checking module 320 can check the consistency of the L1-L1 distributed arbiter in the L1 address repeater with the control signals received from the L2 address repeater. If the predictions made by the L1-L1 distributed arbiter in the L1 address repeater does not match the control signals received from the L2 address repeater, then the consistency-checking module 320 generates an error. The control signals received from the L2 address repeater are described in Section 5.3.2.1.1, 5.3.2.1.2, and 5.3.2.1.3. In addition, the PREDICT-REQUEST state is described in Section 5.4.1 and the PREDICT-INCOMING state is described in Section 5.4.2.

5.2.1.4.1 TRAN-VALID-L2 Errors

Figure 8A:
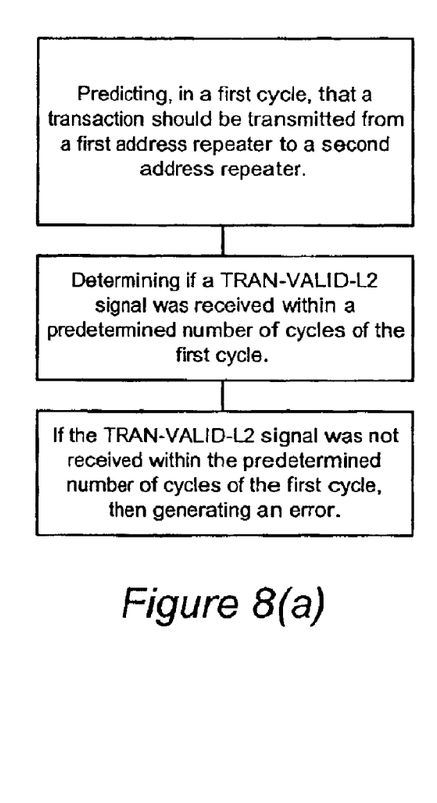
FIGS. 8(a), 8(b) and 8(c) present flow diagrams of methods that may be performed by embodiments of consistency-checking modules.

In one embodiment of the invention, the consistency-checking module 320 will generate an error if the L1-L1 distributed arbiter predicts a PREDICT-REQUEST state and a TRAN-VALID-L2 signal 195 is not received a predetermined number of cycles after the PREDICT-REQUEST state was predicted. For example, in one embodiment, the consistency-checking module 320 will generate an error if the L1-L1 distributed arbiter predicts a PREDICT-REQUEST state and a TRAN-VALID-L2 signal 195 is not received in the following bus cycle. If no error is generated, then the prediction by the L1 address repeater's L1-L1 distributed arbiter is consistent with the L2 address repeater's arbiter. A flow chart of a method performed by the above embodiment of the consistency-checking module 320 is presented in FIG. 8(a).

Figure 9A:
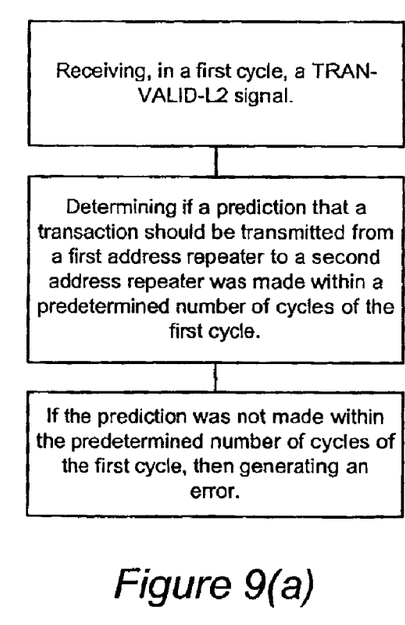
FIGS. 9(a), 9(b) and 9(c) present flow diagrams of methods that may be performed by embodiments of consistency-checking modules.

The consistency-checking module 320 may also generate an error if a TRAN-VALID-L2 signal 195 is received and a PREDICT-REQUEST state was not predicted a predetermined number of cycles before the TRAN-VALID-L2 signal 195 is received. For example, the consistency-checking module 320 may generate an error if a TRAN-VALID signal 195 is received and a PREDICT-REQUEST state was not predicted one cycle before the TRAN-VALID-L2 signal 195 was received. A flow chart of a method performed by the above embodiment of the consistency-checking module 320 is presented in FIG. 9(a).

5.2.1.4.2 INCOMING Errors

Figure 8B:
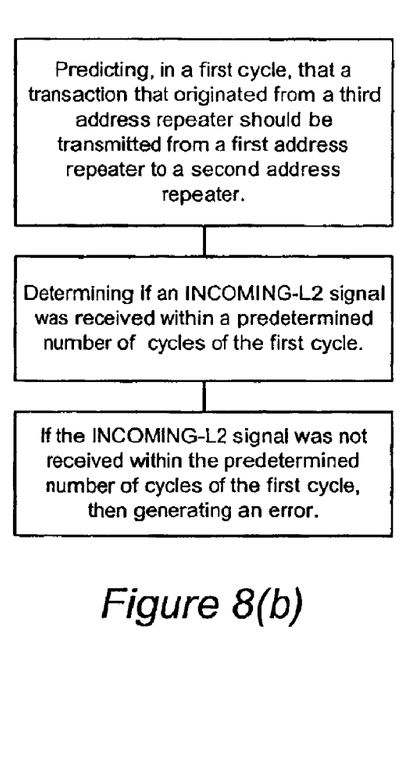

In one embodiment of the invention, the consistency-checking module 320 will also generate an error if the L1-L1 distributed arbiter predicts a PREDICT-INCOMING state and an INCOMING-L2 signal 190 is not received a predetermined number of cycles after the PREDICT-INCOMING state was predicted. For example, in one embodiment, the consistency-checking module 320 will generate an error if the L1-L1 distributed arbiter predicts a PREDICT-INCOMING state and an INCOMING-L2 signal 190 is not received in the following bus cycle. If no error is generated, then the prediction by the L1 address repeater's L1-L1 distributed arbiter is consistent with the L2 address repeater's arbiter. A flow chart of a method performed by the above embodiment of the consistency-checking module 320 is presented in FIG. 8(b).

Figure 9B:
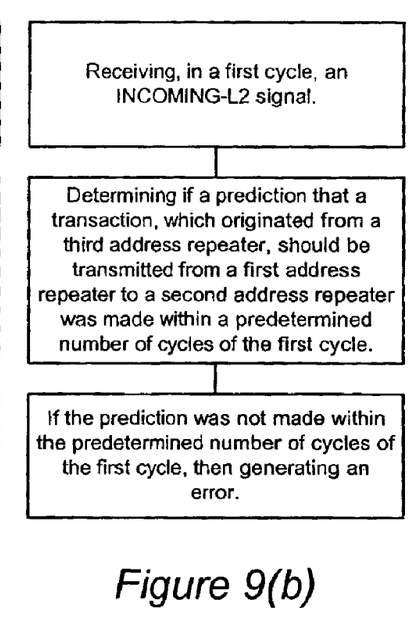

The consistency-checking module 320 may also generate an error if an INCOMING-L2 signal 190 is received and a PREDICT-INCOMING state was not predicted a predetermined number of cycles before the INCOMING-L2 signal 190 is received. For example, the consistency-checking module 320 may generate an error if an INCOMING-L2 signal 190 is received and a PREDICT-INCOMING state was not predicted one cycle before the INCOMING-L2 signal 190 was received. A flow chart of a method performed by the above embodiment of the consistency-checking module 320 is presented in FIG. 9(b).

5.2.1.4.3 PRE-REQUEST-L2 Errors

Figure 8C:
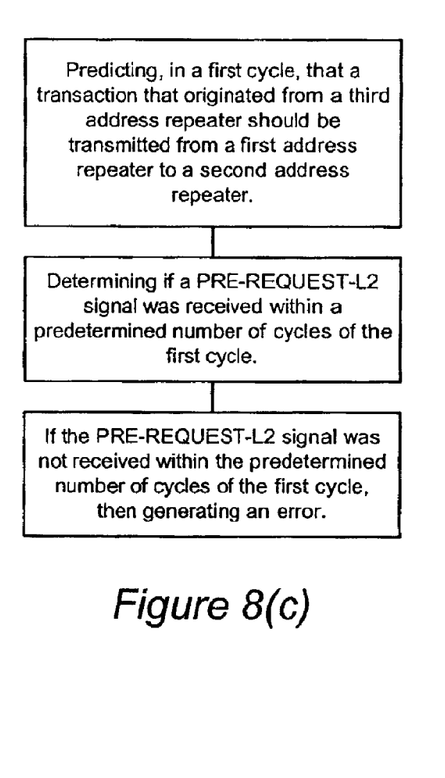

In one embodiment of the invention, the consistency-checking module 320 will generate an error if the L1-L1 distributed arbiter predicts a PREDICT-REQUEST state and a PRE-REQUEST-L2 signal 185 is not received a predetermined number of cycles after the PREDICT-REQUEST state was predicted. For example, in one embodiment, the consistency-checking module 320 will generate an error if the L1-L1 distributed arbiter predicts a PREDICT-REQUEST state and a PRE-REQUEST-L2 signal 185 is not received in the following bus cycle. If no error is generated, then the prediction by the L1 address repeater's L1-L1 distributed arbiter is consistent with the L2 address repeater's arbiter. A flow chart of a method performed by the above embodiment of the consistency-checking module 320 is presented in FIG. 8(c).

Figure 9C:
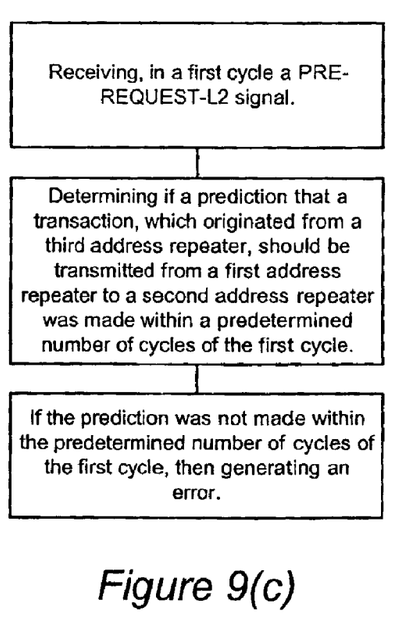

The consistency-checking module 320 may also generate an error if a PRE-REQUEST-L2 signal 185 is received and a PREDICT-REQUEST state was not predicted a predetermined number of cycles before the PRE-REQUEST-L2 signal 185 is received. For example, the consistency-checking module 320 may generate an error if a PRE-REQUEST-L2 signal 185 is received and a PREDICT-REQUEST state was not predicted one cycle before the PRE-REQUEST-L2 signal 185 was received. A flow chart of a method performed by the above embodiment of the consistency-checking module 320 is presented in FIG. 9(c).

5.3 L2 Address Repeater

Figure 6:
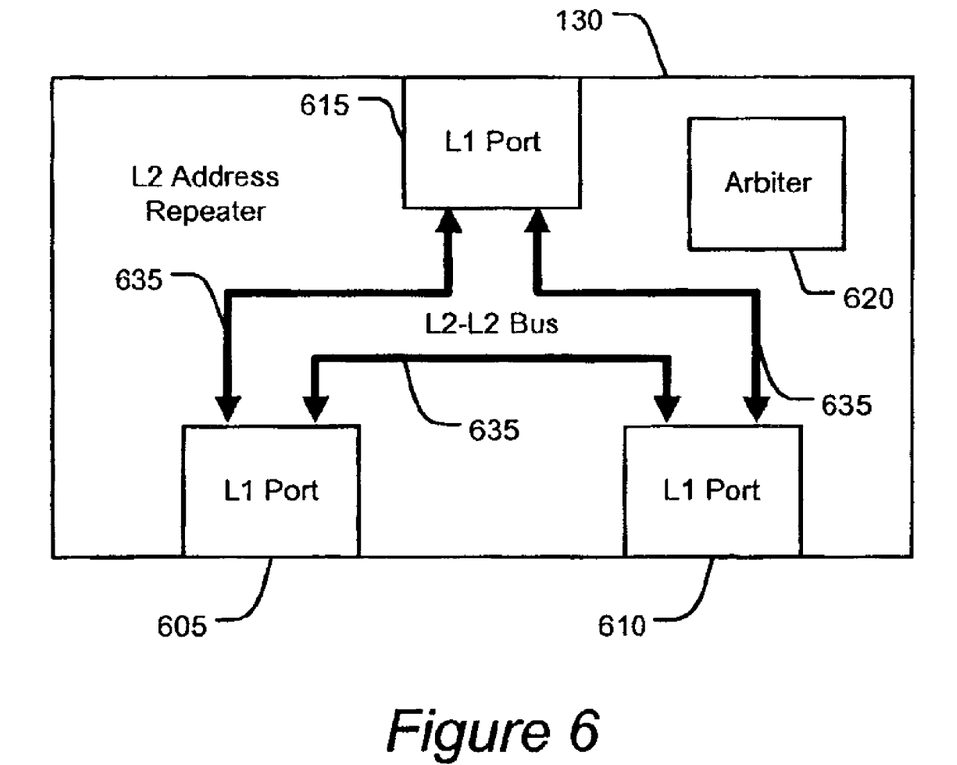
FIG. 6 presents a block diagram of an L2 address repeater.

FIG. 6 presents a block diagram of the L2 address repeater 130. The L2 address repeater 130 includes a plurality of L1 ports 605, 610, and 615. The L1 ports 605, 610, and 615 are further described in Section 5.3.1. In one embodiment, the first L1 port 605 may be coupled to L1 address repeater node 125 and the second L1 port 610 may be coupled to the second L1 address repeater node 155. In addition, the third L1 port 615 may be coupled to an L1 address repeater node that contains I/O devices (not shown). As shown in FIG. 6, an L2-L2 bus 635 couples the L1 ports 605, 610, and 615.

5.3.1 L1 Port

The L2 address repeater's L1 port is described in U.S. patent application Ser. No. 09/815,432 entitled "Method and Apparatus for Efficiently Broadcasting Transactions between an Address Repeater and a Client."

5.3.2 L2 Address Repeater Arbiter

As shown in FIG. 6, the L2 address repeater also includes an arbiter 620. The arbiter 620 receives requests from the plurality of L1 ports 605, 610, and 615, and grants one L1 port the right to broadcast a transaction to the other L1 ports. In one embodiment, the arbitration algorithm is a round robin algorithm between the plurality of L1 ports 605, 610, and 615. However, other arbitration algorithms, such as priority-based algorithms, known by those skilled in the art may also be utilized.

Figure 7A:
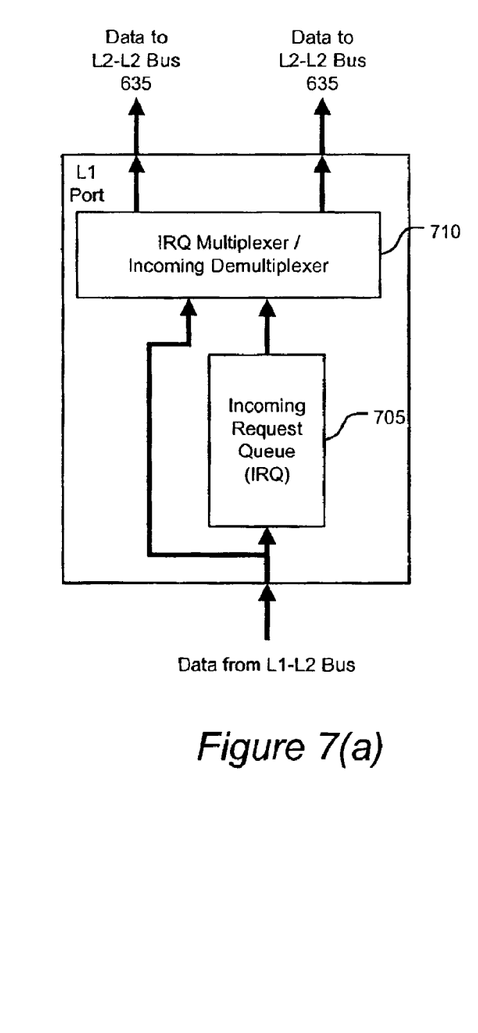
FIG. 7(a) presents a block diagram of an L1 port.
Figure 7B:
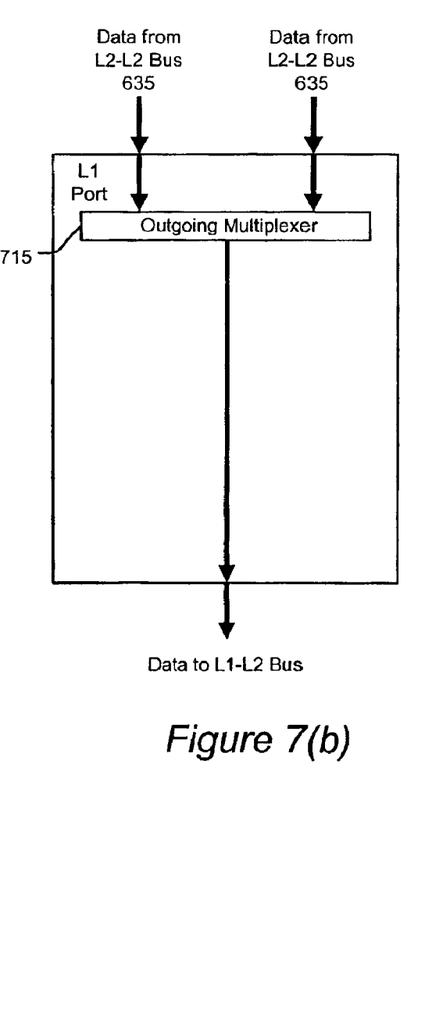
FIG. 7(b) presents another block diagram of an L1 port.

In some embodiments of the invention, each of the L1 ports 605, 610, and 615 has an incoming request queue (IRQ) 705 as shown in FIG. 7(a). In such embodiments, if an L1 port requests access to the L2-L2 bus and the request is not granted, the transaction is inserted in the L1 port's IRQ. If this occurs, the L1 port will continue to request access to the L2-L2 bus as long as its IRQ is not empty. In some embodiments of the invention, when an L1 port receives a new transaction and the IRQ is not empty, the new transaction is stored in the IRQ in a manner that will preserve the sequence of transactions originating from the L1's port.

5.3.2.1 Switch Module

In addition to arbitrating between the L1 ports, the L2 arbiter 620 also generates several control signals.

5.3.2.1.1 PRE-REQUEST-L2

One control signal generated by the L2 arbiter switch module, the PRE-REQUEST-L2 signal 185, is sent from the switch module to one or more L1 address repeaters. The PRE-REQUEST-L2 signal 185 is generated by the switch module to notify an L1 address repeater that it is receiving a transaction packet from the L2 address repeater. Thus, the PRE-REQUEST-L2 signal 185 informs an L1 address repeater that the L2 address repeater is sending the L1 address repeater a transaction. The distributed L1-L1 arbiter 310 in the L1 address repeater should have predicted the sending of the transaction. In some embodiments of the invention, the PRE-REQUEST-L2 signal 185 may indicate that L1 address repeater should have received a transaction from the L2 address repeater in the near past. Alternatively, the PRE-REQUEST-L2 signal 185 may indicate that the L1 address repeater should be receiving the transaction or will be retrieving the transaction in the near future. As more fully discussed in Section 5.2.1.4.3 above, the PRE-REQUEST-L2 signal 185 may be utilized for checking the consistency between the L1 address repeater and the L2 address repeater.

5.3.2.1.2 INCOMING-L2

A second control signal generated by the L2 address repeater switch module is the INCOMING-L2 signal 190. The INCOMING-L2 signal 190 is sent from the switch module to one or more L1 address repeaters. The L2 address repeater generates the INCOMING-L2 190 signal to notify an L1 address repeater that the L1 address repeater should retrieve a transaction from its ORQ. In some embodiments of the invention, the INCOMING-L2 signal 190 could indicate that the L1 address repeater should have previously retrieved the transaction from its ORQ or should retrieve the transaction in the near future. In other embodiments, the INCOMING-L2 signal 190 could indicate that the L1 address repeater should have retrieved the transaction in the same bus cycle as the INCOMING-L2 signal 190 was received. As more fully discussed in Section 5.2.1.4.2 above, the INCOMING-L2 signal 190 may be utilized for checking the consistency between the L1 address repeater and the L2 address repeater.

5.3.2.1.3 TRAN-VALID

A third control signal generated by the L2 address repeater switch module is the TRAN-VALID-L2 signal 195. The TRAN-VALID-L2 signal 195 is sent from the switch module to one or more L1 address repeaters. The L2 address repeater generates the TRAN-VALID-L2 signal 195 to notify an L1 address repeater that a valid transaction is on the L1-L2 bus that couples the L2 address repeater to the L1 address repeater. Alternatively, in some embodiments of the invention, the TRAN-VALID-L2 signal 195 could indicate that a valid transaction was placed on the L1-L2 bus in the near past or will be placed on the L1-L2 bus in the near future. As more fully discussed in Section 5.2.4.1 above, the TRAN-VALID-L2 signal 195 may be utilized for checking the consistency between the L1 address repeater and the L2 address repeater.

5.4 L1 Predicted States

5.4.1 PREDICT-REQUEST State

Because each L1 address repeater is aware of the number of transactions in each of the IRQs in the L2 address repeater and each L1 address repeater implements the same arbitration scheme as the L2 address repeater, each L1 address repeater can predict all communications between the L1 address repeater and the L2 address repeater. Thus, an L1 address repeater can predict when it will receive a transaction from the L2 address repeater. When an L1 address repeater makes such a prediction, it enters a PREDICT-REQUEST state.

5.4.2 PREDICT-INCOMING State

As discussed in Section 5.4.1, each L1 address repeater can predict all communications between the L1 address repeaters and the L2 address repeater. Thus, in some embodiments, an L1 address repeater can predict the L1 address repeater that originated a transaction that will next be broadcasted by the L2 address repeater.

If an L1 address repeater predicts that it originated the transaction that will be broadcast by the L2 address repeater, then the L1 address repeater will enter a state that will be referred to as a PREDICT-INCOMING state.

5.5 Conclusion

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, it is contemplated to have additional L1 address repeater nodes, and more than one L2 address repeater. By increasing the number of such components, redundant components, such as a L2 address repeater, may be "swapped out" while allowing the computer system to continue to run.

In addition, while the above description and Figures discuss CPUs and CPU ports, the invention is not so limited. Any client device, such as but not limited to, memory controllers, I/O bridges, DSPs, graphics controllers, repeaters, such as address repeaters and data repeaters, and combinations and networks of the above client devices could replace the above described CPUs. Similarly, any port interfacing any of the above client devices could replace the CPU ports described above and still be within the scope of the present invention. Further, while the above description and Figures discuss address repeaters, the invention is not so limited. Any repeater, such as data repeaters could replace the described address repeaters and be within the scope of the present invention.

Further, the above disclosure is not intended to limit the present invention. The scope of the present invention is defined by the appended claims.

What is claimed is:

1. In a computer system having a first repeater and a second repeater, the first repeater coupled to the second repeater by a bus, the first repeater operable to transmit a transaction and a control signal to the second repeater, a method, performed by the second repeater, of generating an error comprising:
    a) predicting, in a first cycle, that a transaction should be transmitted from the first repeater to the second repeater, the act of predicting including an arbiter predicting, based at least in part upon the arbiter receiving a second signal from a third repeater, that the transaction should be transmitted;
    b) determining if a control signal was received within a predetermined number of cycles of the first cycle; and
    c) if the control signal was not received within the predetermined number of cycles of the first cycle, then generating an error.

2. The method of claim 1, wherein the act of an arbiter predicting that the transaction should be transmitted includes a distributed arbiter predicting that the transaction should be transmitted.

3. The method of claim 1, wherein the act of determining if the control signal was received includes determining if a valid transaction signal was received.

4. The method of claim 1 wherein the predetermined number of cycles is one cycle.

5. In a computer system having a first repeater, a second repeater, and a third repeater, the first repeater coupled to the second repeater and the third repeater, the first repeater operable to transmit a transaction to the second repeater and operable to transmit a control signal to the third repeater, a method, performed by the third repeater, of generating an error comprising:
    a) predicting, in a first cycle, that a transaction that originated from the third repeater should be transmitted from the first repeater to the second repeater;
    b) determining if a control signal was received within a predetermined number of cycles of the first cycle; and
    c) if the control signal was not received within the predetermined number of cycles of the cycle in which the prediction was made, then generating an error.

6. The method of claim 5, wherein the act of predicting that a transaction should be transmitted includes an arbiter predicting that the transaction should be transmitted.

7. The method of claim 6, wherein the act of an arbiter predicting that the transaction should be transmitted includes a distributed arbiter predicting that the transaction should be transmitted.

8. The method of claim 6, wherein the act of the arbiter predicting that the transaction should be transmitted is based at least in part upon the arbiter receiving a control signal from the second repeater.

9. The method of claim 5, wherein the predetermined number of cycles is one cycle.

10. The method of claim 5, wherein the act of determining if the control signal was received includes determining if an INCOMING-L2 signal was received.

11. The method of claim 5, wherein the predetermined number of cycles is one cycle.

12. In a computer system having a first repeater, a second repeater, and a third repeater, the first repeater coupled to the second repeater and the third repeater, the first repeater operable to transmit a transaction to the second repeater and operable to transmit a control signal to the second repeater, a method, performed by the second repeater, of generating an error comprising:
    a) predicting, in a first cycle, that a transaction that originated from the third repeater should be transmitted from the first repeater to the second repeater;
    b) determining if a control signal was received within a predetermined number of cycles of the first cycle; and
    c) if the control signal was not received within the predetermined number of cycles of the first cycle, then generating an error.

13. The method of claim 12, wherein the act of predicting that a transaction should be transmitted includes an arbiter predicting that the transaction should be transmitted.

14. The method of claim 13, wherein the act of an arbiter predicting that the transaction should be transmitted includes a distributed arbiter predicting that the transaction should be transmitted.

15. The method of claim 13, wherein the act of the arbiter predicting that the transaction should be transmitted is based at least in part upon the arbiter receiving a control signal from the second repeater.

16. The method of claim 12, wherein the predetermined number of cycles is one cycle.

17. The method of claim 12, wherein the act of determining if the control signal was received includes determining if an INCOMING-L2 signal was received.

18. The method of claim 12, wherein the predetermined number of cycles is one cycle.

* * * * *